United States Patent [19]

Hatta

[11] Patent Number: 4,796,215

[45] Date of Patent: Jan. 3, 1989

[54] PROGRAMMABLE CALCULATOR WITH EXTERNAL MEMORY MODULE AND PROTECTION AGAINST ERRONEOUS ERASURE OF DATA IN THE MODULE

[75] Inventor: Koichi Hatta, Yamatokoriyama, Japan

[73] Assignee: Sharp Kabushiki Kaisha, Osaka, Japan

[21] Appl. No.: 736,712

[22] Filed: May 22, 1985

[30] Foreign Application Priority Data

May 22, 1984 [JP] Japan .................. 59-104210

[51] Int. Cl.⁴ .............................. G06F 15/02
[52] U.S. Cl. ...................... 364/706; 364/900
[58] Field of Search ........ 364/706, 709, 900 MS File, 364/200 MS File

[56] References Cited

U.S. PATENT DOCUMENTS

| | | | |
|---|---|---|---|
| 3,971,925 | 7/1976 | Wenninger et al. | 364/706 |
| 4,012,725 | 3/1977 | Spangler et al. | 364/706 |
| 4,063,221 | 12/1977 | Watson et al. | 364/706 |
| 4,075,679 | 2/1978 | Christopher et al. | 364/900 |
| 4,091,446 | 5/1978 | Demonte et al. | 364/706 |
| 4,126,898 | 11/1978 | Spangler et al. | 364/706 |
| 4,153,937 | 5/1979 | Poland | 364/706 |
| 4,636,970 | 1/1987 | Morino et al. | 364/706 |

Primary Examiner—Gary V. Harkcom
Assistant Examiner—Long Thanh Nguyen
Attorney, Agent, or Firm—Birch, Stewart, Kolasch & Birch

[57] ABSTRACT

A programmable calculator using at least one exchangeable reloadable memory module includes a connector for connecting the exchangeable reloadable memory module to the calculator. The calculator judges whether a program including information to execute said program is present in said exchangeable reloadable memory module, and inhibits erasure of the information to execute the program when presence of the program in the exchangeable reloadable memory module is judged by the calculator at the time of initialization of the programmable calculator.

3 Claims, 5 Drawing Sheets

PROGRAMMABLE CALCULATOR WITH EXTERNAL MEMORY MODULE AND PROTECTION AGAINST ERRONEOUS ERASURE OF DATA IN THE MODULE

FIELD OF THE INVENTION

The present invention relates to a programmable calculator such as a hand-held electronic calculator using a memory module containing a RAM backed up by a battery.

BACKGROUND OF THE INVENTION

In hand-held electronic programmable calculators, it is well known to use one or more external memory modules for an extension of memory capacity or for storing an applications program in a case where a basic program is permanently stored in a ROM. In the calculator system as described above, if the memory module containing a RAM is backed up by a battery for preserving the contents stored in RAM, the RAM may be used as the memory module for storing the applications program in place of using ROM. However, if a RAM is used for storing the applications program as mentioned above, there exists the possibility that the applications program stored in RAM may be erroneously deleted at the time of execution of the initialization program of the system when power is first turned on.

SUMMARY OF THE INVENTION

The present invention is directed to eliminating the drawback as described above and its object is to provide an electronic programmable calculator which is able to execute a program stored in a memory module when the memory module is inserted into the calculator and also to provide a programmable calculator which is able to write programs into the module when the memory module is insulated in the programmable calculator.

According to the present invention, there is provided a programmable calculator using at least one exchangeable reloadable memory module comprising a connector for connecting the exchangeable reloadable memory module to the calculator, means for judging whether a program including information to execute said program is present in said exchangeable reloadable memory module, and means for inhibiting erasure of the information to execute said program when the presence of said program in said exchangeable reloadable memory module is judged by said judging means at the time of initialization of the programmable calculator.

According to the present invention, there is further provided programmable calculator using at least one exchangeable reloadable memory module comprising a connector for connecting the exchangeable memory module to the calculator, means for judging whether a program including information to execute the program is present in said exchangeable reloadable memory module, means for inhibiting erasure of the information to execute said program when the presence of said program in said exchangeable reloadable memory module is judged by said judging means at the time of initialization of the programmable calculator, and means for initializing said exchangeable reloadable memory module when the absence of the program in the exchangeable reloadable memory module is judged at the time of initialization of the programmable calculator.

DETAILED DESCRIPTION OF A PREFERRED EMBODIMENT

Figure 1:
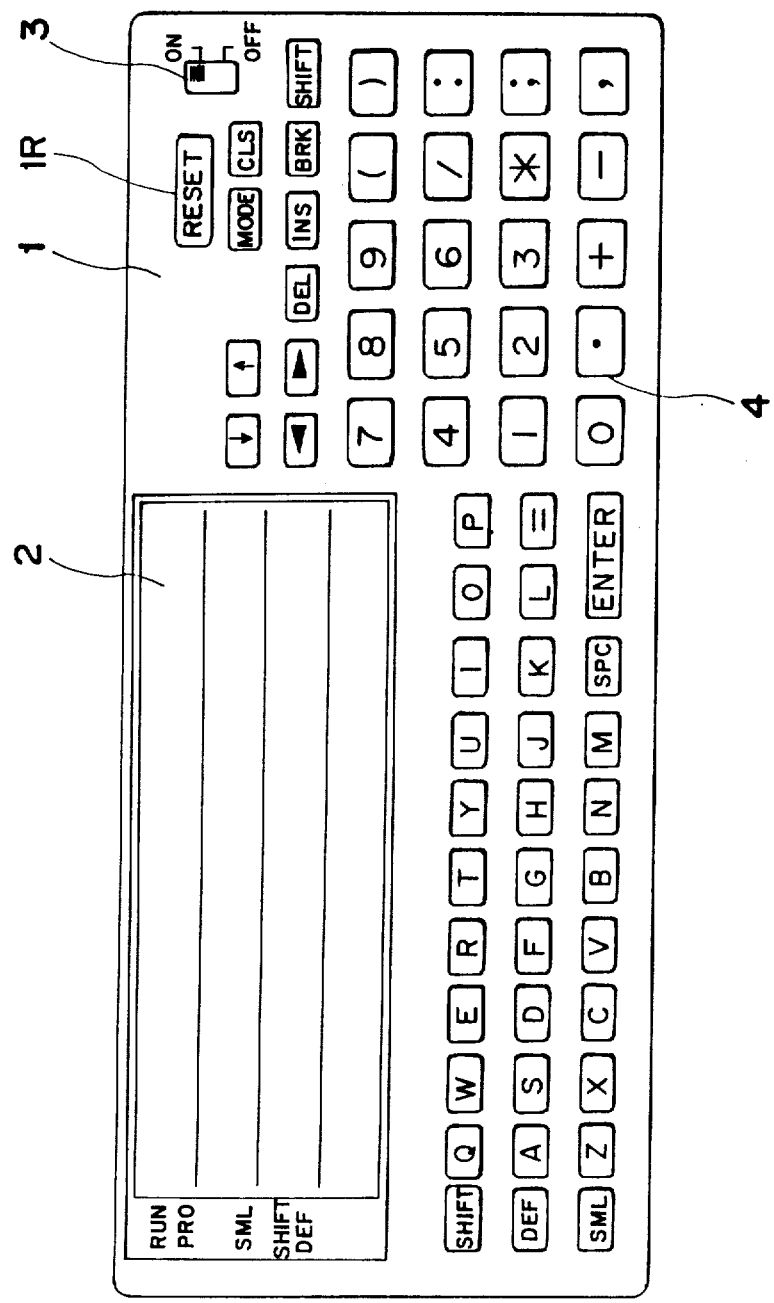
FIG. 1 is a top plan view showing one example of a programmable calculator according to the present invention.

Referring to FIG. 1, there are shown a calculator body 1, a display unit 2, a power switch 3 and a keyboard 4.

Figure 2:
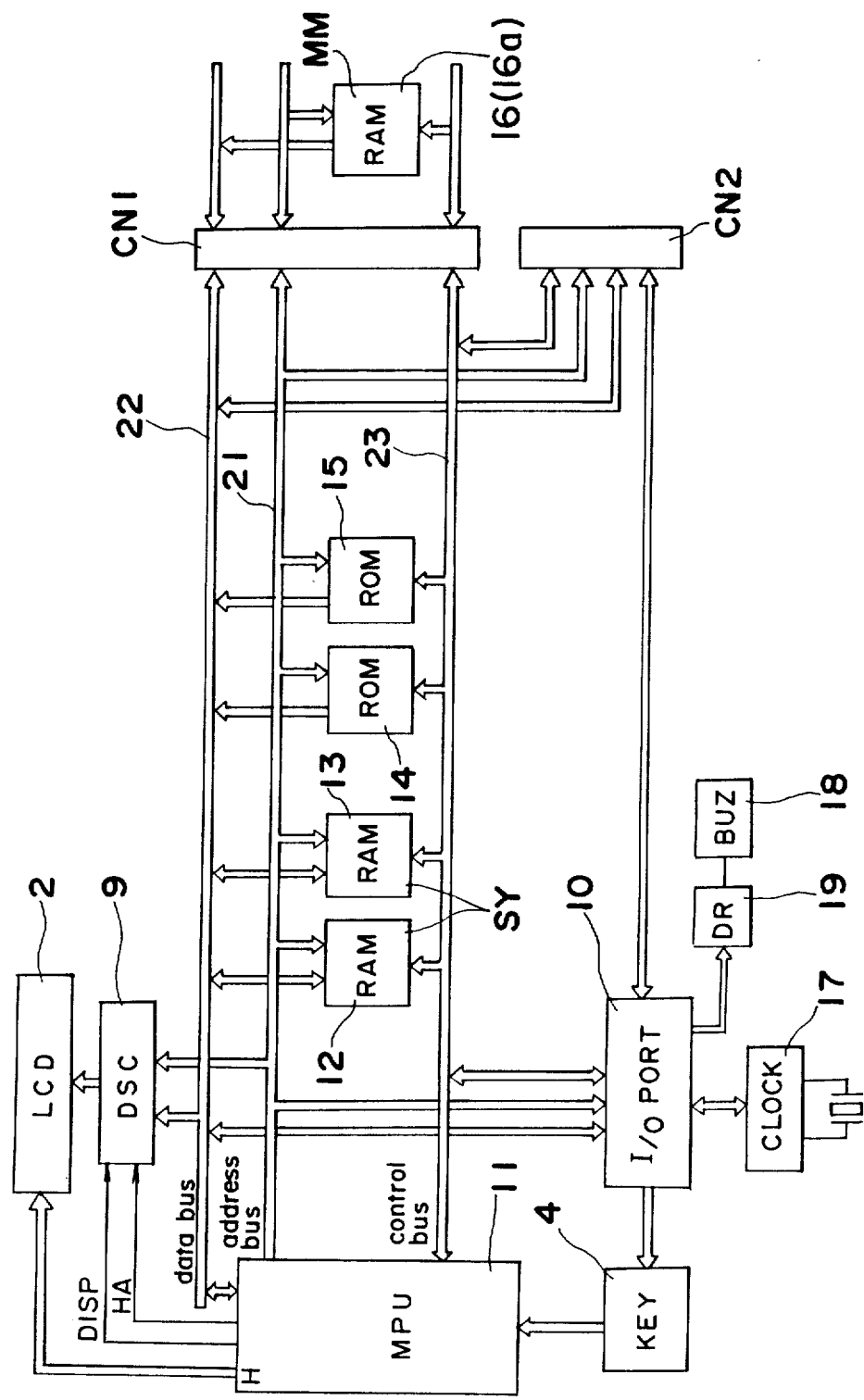
FIG. 2 is a block diagram showing a circuit arrangement of the programmable calculator shown in FIG. 1, FIG. 3 and FIG. 4 are flow charts showing the procedure of the programmable calculator.

Referring to FIG. 2, the display unit 2 is formed by a liquid crystal display device. A display control unit 9 referred to as DSC is provided to drive the display unit LCD so as to display various characters including numeric characters and symbols by turning on one or more of the segments of the liquid crystal display device. The key board 4 is represented by KEY. Keyboard 4 contains numeric keys, various function keys such as a multiplication key, dividing key, reset switch 1R and so on as used in the conventional programmable calculator. Each of the keys is adapted to receive a series of strobe signals from an I/O port 10, and the output signal of each key generated when any key is operated (referred to as key return signal) is transferred to a microprocessor unit 11 represented by MPU in FIG. 2. The RAMs 12 and 13 are made of read and write memory and act as registers, flags and memory devices to store various programs. The ROMs 14 and 15 are made of read only memory, wherein an interpreter for executing the programs and other control programs are stored. A connector CN1 is provided for connecting an external RAM 16 or ROM acting as an interchangeable memory module with the programmable calculator. The respective RAMs and ROMs are connected to an address bus 21, a data bus 22, and a control bus 23. The I/O port 10 is connected to the address bus 21, the data bus 22 and the control bus 23 for interfacing various data and/or signals between MPU 11 and various external peripheral devices (not shown). A clock device 17 for generating clock signals is connected to the I/O port 10 for transmitting time data between the programmable calculator and the clock device 17. A buzzer 18 is connected to the I/O port 10 through a driver 19.

A connector CN2 is provided for connecting additional extended memory or memories (not shown) and/or various input-output units such as a data recorder, printer and so on. Moreover, the microprocessor unit 11 outputs a synchronizing signal HA, a display ON/OFF signal DISPLAY to the display control unit 9, and a back plate signal H to the display unit 2. The display control unit 9 contains a memory to store the display data which corresponds to the respective segments in the liquid crystal display device of the display unit 2. The respective bits in the memory correspond to the respective segments of the LCD. Therefore the desired characters and symbols can be displayed by writing the data bit-by-bit in the memory corresponding to the pattern to be displayed.

The programmable calculator shown in this embodiment is provided with an auto power off function so that the power to the calculator is automatically turned off when the calculator is not in use for a predetermined period of time.

Figure 3:
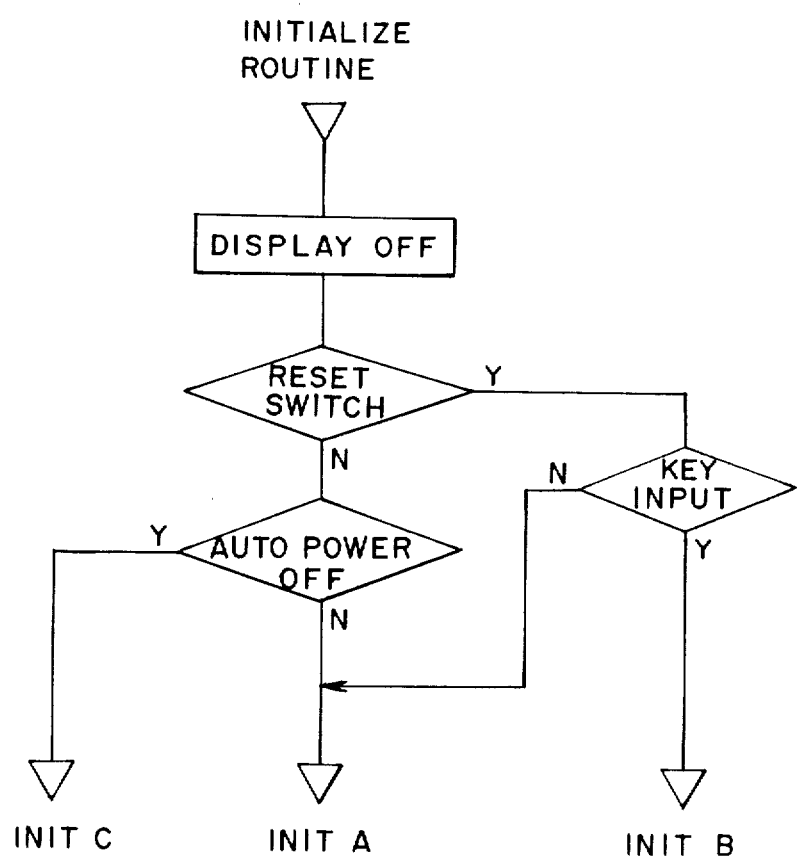

FIGS. 3. and 4 are flow charts showing the initialize routine of the programmable calculator.

The initialize routine is performed when a reset switch of the programmable calculator is pressed, when a power switch is turned on, when an ON key of the programmable calculator is pressed in response to the auto power-off condition, or when the reset switch is operated pressing a key, and in all the cases the program can be executed from the start address.

In each case, the initialize routine is performed as shown in FIG. 3. First of all, the display is cleared, and it is judged whether the reset switch 1R is activated or not. If the reset switch is activated, it is determined whether the reset switch 1R is operated or not by pressing any key, by judging whether any key is pressed, and if so, the INITB routine is performed. If any key is not pressed, the INITA routine is performed. If the reset switch 1R is not operated, it is judged whether the ON key is operated or not in response to the auto power-off condition. If the ON key is so operated, the INITC routine is performed. If the ON key is operated when the power switch is turned on, then the INITA routine is performed. In each processing of the INITB and the INITC routines, the flag and counter are reset and set up, these processings being contained in the INITA. Therefore, the INITA routine will be explained later.

Figure 5:
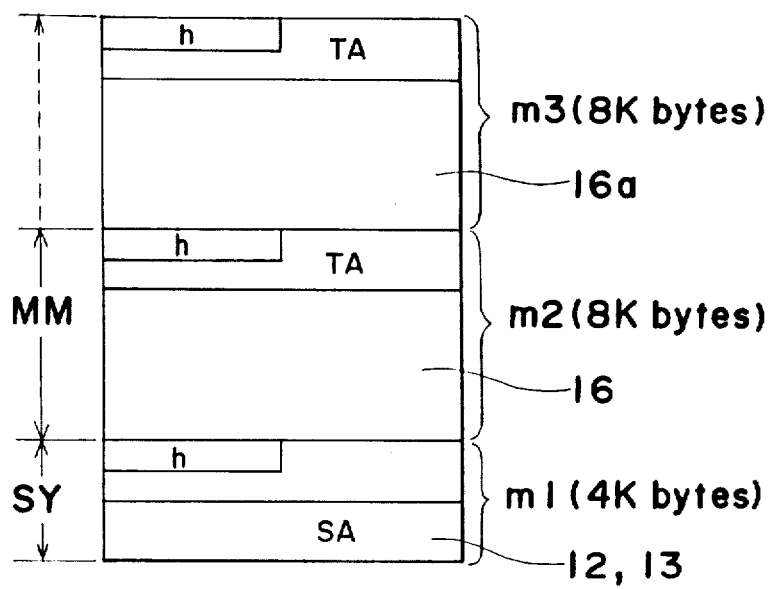
FIG. 5 and FIG. 7 are schematic diagrams showing the memory allocations of the programmable calculator and FIG. 6 is a schematic diagram showing one example of a display displayed in the programmable calculator.

Referring to FIG. 5 showing the memory allocations of the programmable calculator, wherein SY is the RAM 12 and 13 provided in the body of the programmable calculator having a capacity of 4 kilobytes, and MM is the RAM 16 of the external memory module. When the RAM 16 which has a capacity of 8 kilobytes is mounted, the total memory capacity of the programable calculator amounts to 12 kilobytes by summing up m1 and m2. Furthermore, when another external RAM 16a which has a capacity of 8 kilobytes is mounted, the memory capacity amounts to 20 kilobytes by summing up m1, m2 and m3.

Figure 4:
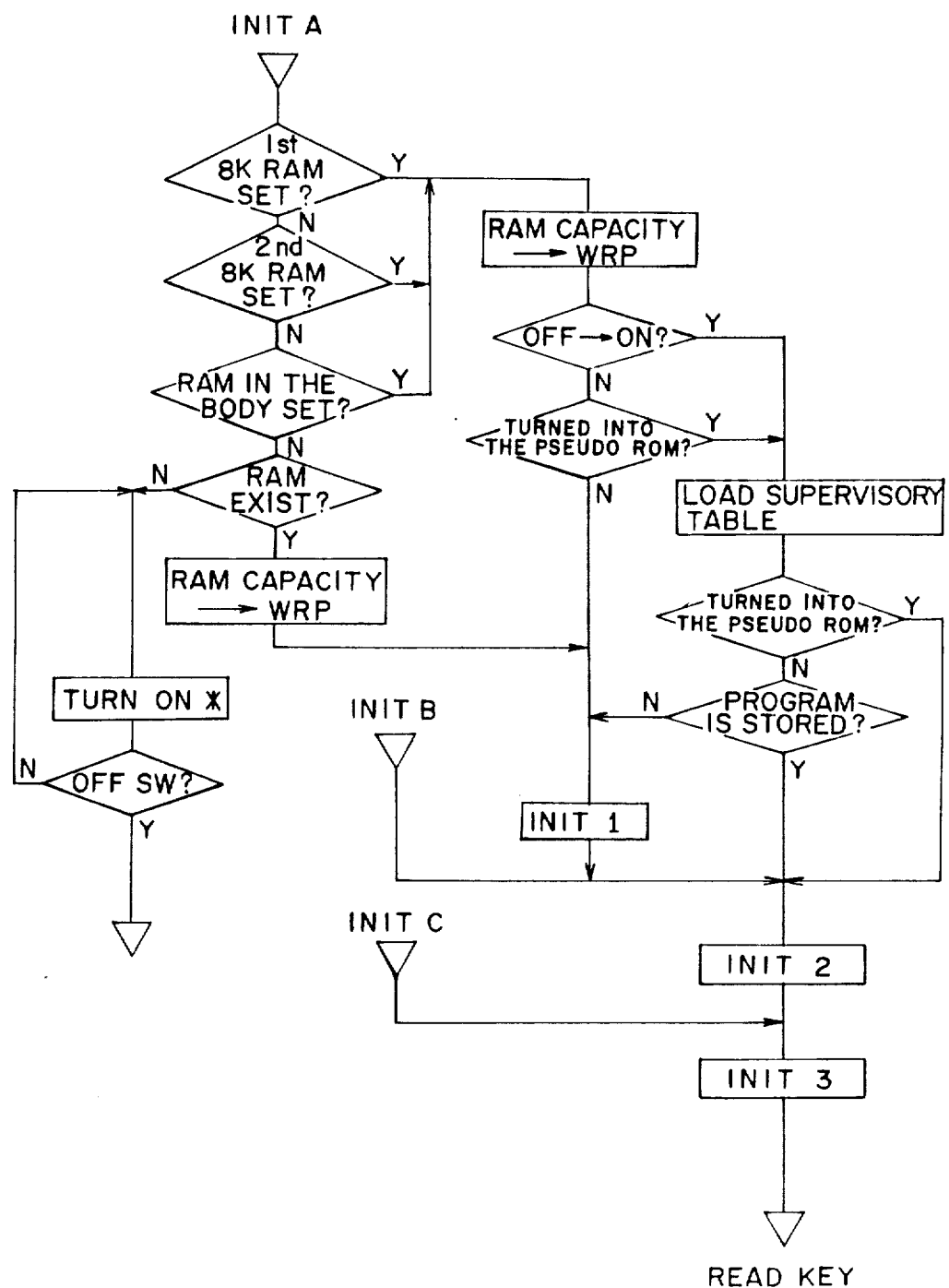
Figure 6:
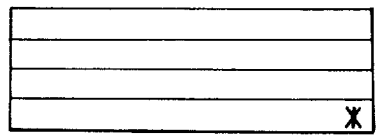
Figure 7:
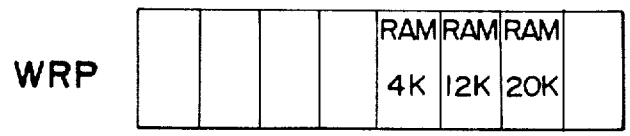

At the first address of each RAMs 12, 13, 16 and 16a, a header h is stored in each RAM. In the INITA, as shown in FIG. 4, each header h in the RAMs 16 and 16a is checked. Checking the header means checking the data in the first 6 bytes of each RAM from the leading address in the RAMs, and in case of the already initialized RAM, a specific data is stored in said 6 bytes. In case of an uninitialized RAM, which means an unused RAM, no specific data is stored in the 6 bytes. On checking the header, if specific data has not been stored in the first 6 bytes, the header in the RAM 16 is checked similarly. Moreover, if the header does not coincide with the specific data, the headers in the RAM 12 and 13 in the body are checked. In this case, if the header does not coincide with the specific data, that means that the RAMs 16 and 16a do not exist at all, or that any one of the RAMs exists but an unused RAM is mounted. Therefore, next, it is judged whether any one of the RAMs 12, 13, 16 and 16a exist or not. If any RAMs do not exist, a mark "*" is turned on at the right most digit on the 4th line in the display unit 2 as shown in FIG. 6. The mark "*" is used for checking the presence or absence of the RAMs 12, 13, 16 and 16a at the time of the production of the calculator. That is, turning on of the mark "*" is caused by a defect in connecting by soldering etc. of the RAM with the calculator, thus such defect can be discovered. Next, determination of whether the OFF switch has been operated is conducted. If so, the step advances to further processing. In case any one of the RAMs 12, 13, 16 and 16a exist, the information of the RAM capacity is stored at the flag in the register WRP as shown in FIG. 7. After that, the INIT1, the INIT2 and the INIT3 routines are performed in order, and then reading the key is performed. When each header in the RAMs 16 and 16a of 8 kilobytes and in the RAMs 12 and 13 in the body coincides with the specific data, this state means that the RAMs 12, 13, 16 and 16a have been already respectively initialized. At that time the information of the RAM capacity is also stored in the register WRP.

Next, it is judged whether the power switch is turned on or not. If the power switch is not turned on, that represents that the reset switch is operated, and it is then judged whether a RAM 16 (or 16a) has been turned into the pseudo ROM. Since the RAM was turned into the pseudo ROM, writing into the RAM has been inhibited, and the information has been stored at the flag of a system area in the RAMs 12 and 13 in the body. In FIG. 5, SA denotes a system area. TA denotes a supervisory table which has been stored in the memory module, so that even when the external RAMs 16 and 16a are taken out, the contents of the system area SA have been stored in the system area TA of the RAM. That is, when the external RAMs 16 and 16a are mounted, the contents of the supervisory table stored in the area SA of the RAMs 12 and 13 are transferred to the system area TA of the external RAMs 16 and 16a, thus various conditions are set up according to the connecting condition of the external RAMs 16 and 16a.

On the other hand, if the RAMs 16 and 16a have not been turned into the pseudo ROM, the INIT1, the INIT2 and the INIT3 routines are performed in order, and then reading the key is performed. When the power switch is operated, or when not only the reset switch is operated but also the RAMs have been turned into the pseudo ROM, the supervisory table of the program is transferred into the RAM which contains the system program. In the supervisory table, the pointer and the flag etc. to execute the program, for example, the leading address and the last address of the program, are stored. After that, it is judged whether the program stored in the RAMs 16 and 16a have been turned into the pseudo ROM or not. If it has, the INIT2 and the INIT3 are performed in order, and then reading the key is performed. If the program has not been turned into the pseudo ROM, it is judged whether the program exists, if the program does not exist the INIT1 is performed, whereas if the program exists the INIT2 and the INIT3 are performed in order. After that, reading the key is performed. In the above processing, in order to judge whether the program exists or not, the last address in the program is read, and it is judged whether its read information coincides with a specific code which should be inputted at the last address or not. The above procedures enable initialization according to memory module which has been mounted.

Finally, in the above INIT1 through INIT3, the following procedures are performed. In the INIT1, setting up the leading and the last address in the program, erasing the program, erasing the fixed variable and the array variable, and setting up a variable area of the array variable etc. above the system area, are performed. In the INIT2, initializing the flag, the pointer, and the reset for display and graphic characters, and initial value to generate random numbers, setting up RUN mode, clearing the buffer memory for printing, judging whether it is used for domestic user or foreign user, and clearing the answer memory are performed. In the INIT3, resetting the print mode, setting up key bounce so that any key can not be read when the reset switch is pressed, resetting the flag for display, are performed.

What is claimed is:

1. A programmable calculator including internal memory means for storing data, comprising:

at least one external replaceable random access memory module;

means for determining the presence of applications program instructions and execution instructions in said memory module at the time of initialization of said calculator when power is first turned on;

means for initializing said calculator at the time that power is first turned on, including means for, (a) setting leading and ending addresses of programs to be executed, (b) erasing random access program memories of said calculator including said external memory module, (c) erasing fixed and arrayed variables stored in a memory area of said internal memory means, (d) initializing flags and pointers of said calculator, (e) clearing internal buffer memories of said calculator, and (f) initializing a display of said calculator; and means for inhibiting said initializing means from erasing said program and execution instructions from said external memory module in response to a determination of the presence of said program and execution instructions by said means for determining.

2. A programmable calculator as set forth in claim 1, further comprising means for enabling said initializing means to erase said external memory module in response to a determination of the absence of said program and execution instructions by said means for determining.

3. A programmable calculator as set forth in claim 1, further comprising means for loading said execution instructions of said external memory module into said internal memory means upon turning on said calculator.

* * * * *